US007735024B2

(12) United States Patent
Li et al.

(10) Patent No.: US 7,735,024 B2
(45) Date of Patent: Jun. 8, 2010

(54) METHODS AND APPARATUS TO PROVIDE A HANDHELD POINTER-BASED USER INTERFACE

(75) Inventors: Dan Li, Shanghai (CN); Zhiming Li, Shanghai (CN); Fly Wang, Shanghai (CN); Bin Ni, Lafayette, IN (US)

(73) Assignee: Intel Corporation, Santa Clara, CA (US)

( * ) Notice: Subject to any disclaimer, the term of this patent is extended or adjusted under 35 U.S.C. 154(b) by 1120 days.

(21) Appl. No.: 10/697,672

(22) Filed: Oct. 29, 2003

(65) Prior Publication Data

US 2005/0093830 A1    May 5, 2005

(51) Int. Cl.
G06F 3/033 (2006.01)
G09G 5/00 (2006.01)
(52) U.S. Cl. .................. 715/863; 345/156; 345/157; 345/158; 345/179
(58) Field of Classification Search ......... 345/156–158, 345/173–179; 715/863
See application file for complete search history.

(56) References Cited

U.S. PATENT DOCUMENTS

| 5,027,414 | A |   | 6/1991  | Hilton           |
|-----------|---|---|---------|------------------|
| 5,369,227 | A | * | 11/1994 | Stone ...... 178/19.07 |
| 5,477,012 | A |   | 12/1995 | Sekendur         |
| 5,633,691 | A | * | 5/1997  | Vogeley et al. ...... 348/771 |
| 5,717,168 | A |   | 2/1998  | DeBuisser et al. |
| 5,852,434 | A |   | 12/1998 | Sekendur         |
| 6,184,873 | B1|   | 2/2001  | Ward et al.      |
| 6,335,723 | B1|   | 1/2002  | Wood et al.      |

(Continued)

FOREIGN PATENT DOCUMENTS

WO    WO 98/39729    11/1998

(Continued)

OTHER PUBLICATIONS

*A Revolution in Communication*, http://www.e-pen.com/main.htm, http://www.e-pen.com/techInfo.html, http://www.e-pen.com/advantages.htm, http://www.e-en.com/alliances.htm (printed Oct. 29, 2003).

(Continued)

*Primary Examiner*—Kieu Vu
*Assistant Examiner*—Haoshian Shih
(74) *Attorney, Agent, or Firm*—Hanley, Flight & Zimmerman, LLC (57) ABSTRACT

Methods and apparatus to provide a handheld pointer-based user interface are described herein. An example apparatus includes a wireless pointer component and one or more base components. The wireless pointer component is configured to transmit one or more human-computer interaction (HCI) signals associated with an HCI event via a first communication link. One or more base components are operatively coupled to a screen of a display to receive the one or more HCI signals from the wireless pointer component via the first communication link. Further, the one or more base components are configured to generate at least one of operating information and position information of the wireless pointer component based on the one or more HCI signals, and to transmit the at least one of operating information and position information to a processor configured to generate screen information on the screen of the display via a second communication link.

30 Claims, 9 Drawing Sheets

U.S. PATENT DOCUMENTS

| | | | |
|---|---|---|---|
| 6,414,673 | B1 | 7/2002 | Wood et al. |
| 7,109,979 | B2 * | 9/2006 | Moyne et al. ............... 345/179 |
| 2001/0000666 | A1 * | 5/2001 | Wood et al. ................. 345/179 |
| 2001/0012002 | A1 * | 8/2001 | Tosaya ....................... 345/179 |
| 2002/0163511 | A1 * | 11/2002 | Sekendur .................... 345/179 |
| 2003/0016212 | A1 * | 1/2003 | Lynggaard .................. 345/179 |
| 2003/0151596 | A1 | 8/2003 | Moyne et al. |

FOREIGN PATENT DOCUMENTS

| | | |
|---|---|---|
| WO | WO 0065530 | 11/1998 |
| WO | WO 03001497 | 1/2003 |
| WO | 03050963 | 6/2003 |

OTHER PUBLICATIONS

International Search Report for International Patent Application No. PCT/US2004/036073, Mar. 30, 2005, 5 sheets.

Written Opinion of the International Searching Authority for International Patent Application No. PCT/US2004/036073, Mar. 30, 2005, 7 sheets.

International Preliminary Report on Patentability for International Patent Application No. PCT/US2004/036073, dated May 11, 2006, 9 sheets.

Communication pursuant to Article 96(2) EPC issued in the correponding European patent application No. 04796787.2, dated Jul. 26, 2006, 5 pages.

Korean Intellectual Property Office, "Notice of Reconsideration Result," issued in connection with counterpart Korean patent application No. 10-2006-7008253, mailed July 9, 2008 (4 pages).

Korean Intellectual Property Office, "Notice of Amendment Dismissal," issued in connection with counterpart Korean patent application No. 10-2006-7008253, mailed July 9, 2008 (4 pages).

Japanese Patent Office, "Notice of Reasons for Rejection," issued in connection with counterpart Japanese patent application No. 2006-536943, mailed Aug. 19, 2008 (3 pages).

* cited by examiner

FIG. 13

METHODS AND APPARATUS TO PROVIDE A HANDHELD POINTER-BASED USER INTERFACE

TECHNICAL FIELD

The present disclosure relates generally to user interfaces for processor systems, and more particularly, to methods and apparatus to provide a handheld pointer-based user interface.

BACKGROUND

To provide greater convenience for individuals to use and interact with processor systems such as personal computers (PCs) (e.g., desktop computers, laptop computers, and tablet PCs) and handheld devices (e.g., personal digital assistants (PDAs) and pocket PCs), efforts have been made to improve human-computer interactions (HCI). On tablet PCs and pocket PCs, for example, a user may write, draw, and/or perform any other intuitive aspects of using pen and paper by using natural handwriting with a stylus or an electronic pen directly on the display screens. In fact, the user may use the stylus or the electronic pen instead a mouse and/or a keyboard to perform other computer functions such as inputting text, selecting and opening software applications, scrolling through documents, etc. The touch-sensitive screens allow users to interact with the tablet PCs and the pocket PCs as described above. To provide touch-sensitive screens, typically one or more layers are built into the display screens of the tablet PCs and the pocket PCs. However, most displays and monitors for desktop computers and laptop computers do not include the built-in layers to provide the touch-sensitive screen. As a result, most processor systems are not configured to provide individuals with a user interface using natural and intuitive hand motion such as writing, drawing, etc. Further, touch-sensitive screens are costly to manufacture and inaccurate for larger sized screens.

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in hardware, exclusively in software, exclusively in firmware or in some combination of hardware, software, and/or firmware.

Figure 1:
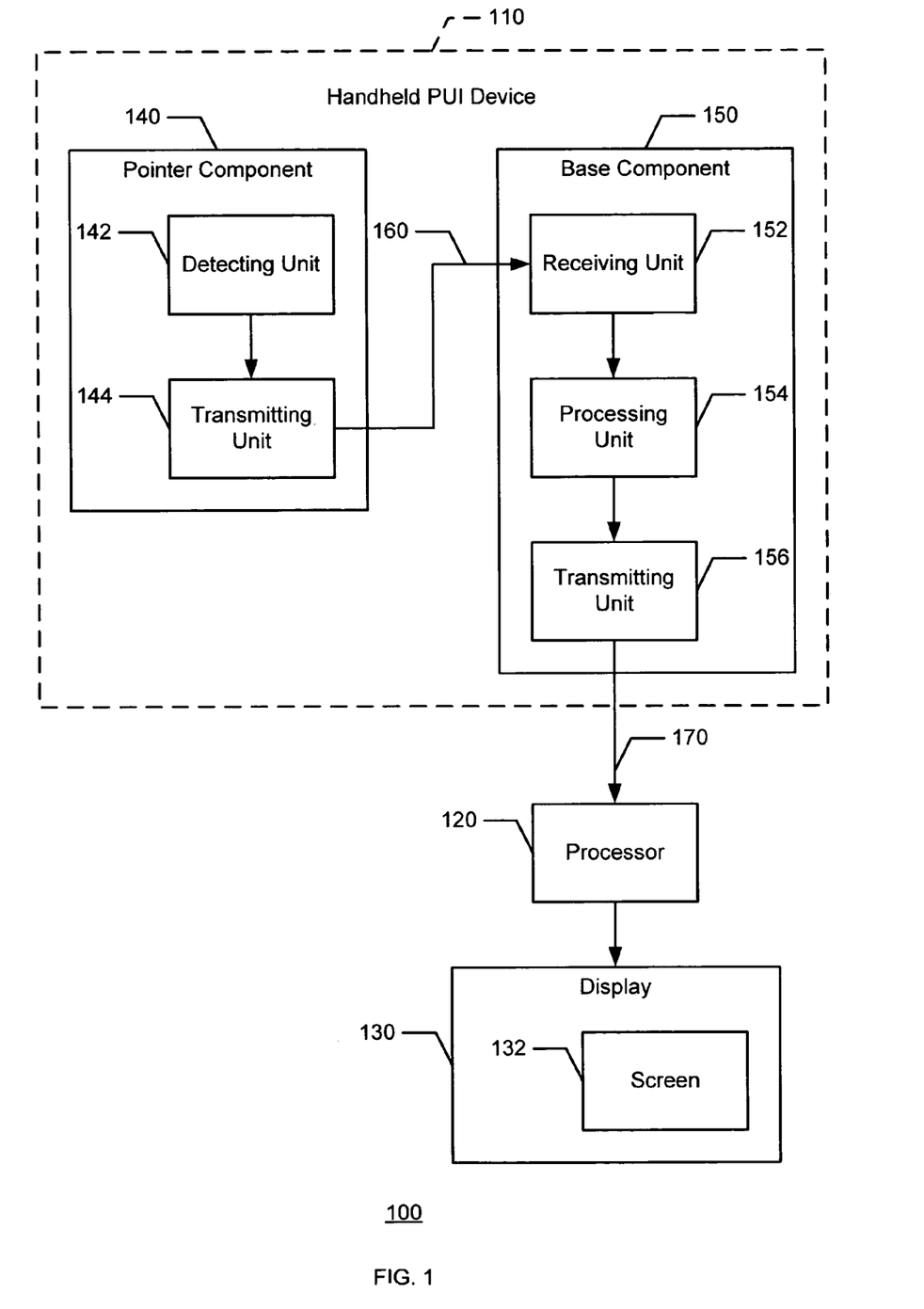
FIG. 1 is a block diagram representation of an example handheld pointer-based user interface (PUI) system.

In the example of FIG. 1, the illustrated handheld PUI system 100 includes a handheld PUI device 110, a processor 120, and a display 130. The handheld PUI device 110 includes a wireless pointer component 140 and one or more base components 150. The wireless pointer component 140 is operatively coupled to the one or more base components 150 via a first communication link 160 (e.g., a wireless link such as an ultrasound-based link). The one or more base components 150 are operatively coupled to the processor 120 via a second communication link 170 (e.g., a wired link and/or a wireless link such as a radio frequency-based link). In general and as described in detail below, the handheld PUI device 110, which may be implemented using a pen-type device, is responsive to human-computer interaction (HCI) events corresponding to hand motion of a user such as writing, drawing, selecting, scrolling, etc. For example, a user may initiate an HCI event by writing directly on the screen 132 of the display 130 with the wireless pointer component 140. The wireless pointer component 140 may transmit one or more HCI signals to the one or more base components 150 via the first communication link 160. Based on the one or more HCI signals, the one or more base components 150 generate and transmit position information to the processor 120 via the second communication link 170. Accordingly, the processor 120 generates screen information corresponding to the HCI event on the screen 132 of the display 130. Thus, the screen information appears on the screen 132 as if the screen information were handwritten directly on the screen 132 by the user. As a result, the handheld PUI device 110 provides an alternative user interface especially for individuals who may have difficulty manipulating a mouse and/or a keyboard to interact with the processor 120. Further, the handheld PUI device 110 provides a user interface based on natural and intuitive hand motion of the user so that the screen 132 may operate touch screen-like but without integrating costly touch-screen technology into the display 130.

The wireless pointer component 140 includes a detecting unit 142 and a transmitting unit 144, which is operatively coupled to the detecting unit 142. The detecting unit 142 is configured to detect an HCI event and to trigger the transmitting unit 144. In one particular example, the detecting unit 142 may be a switch configured to detect when the wireless pointer component 140 has been placed on the screen 132 of the display 130. As mentioned above, the HCI event is initiated by a user. For example, the HCI event may correspond to hand motion of a user such as writing, drawing, selecting, scrolling, etc. The transmitting unit 144 is configured to transmit one or more HCI signals such as ultrasonic signals via the first communication link 160. While the one or more HCI signals of the handheld PUI device 110 shown in FIG. 1 is particularly well suited for implementation with ultrasonic signals, persons of ordinary skill in the art will readily appreciate that the one or more HCI signals may be implemented with radio frequency (RF) signals including infrared, microwaves, and ultra-high-frequency (UHF).

Figure 2:
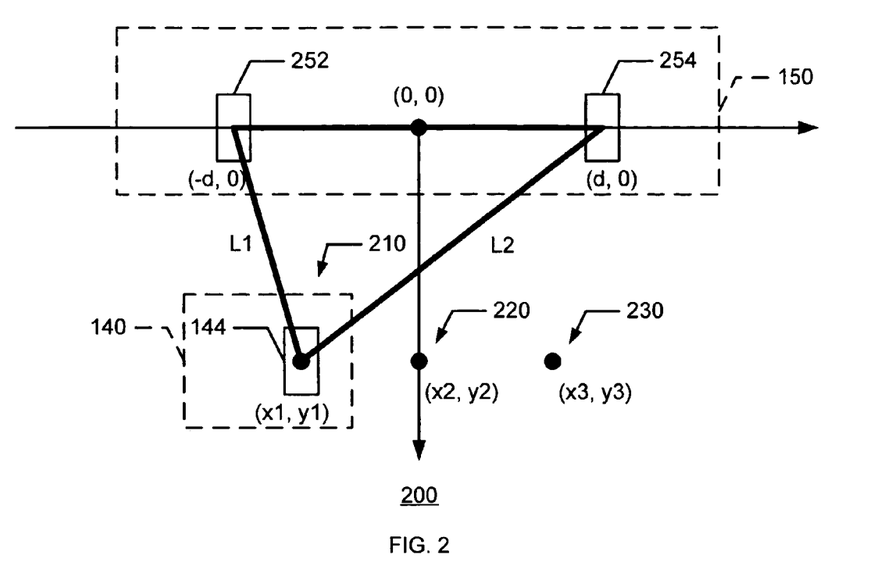
FIG. 2 is a diagram representation of example position information of the example handheld PUI system shown in FIG. 1.

As noted above, the base component 150 is configured to generate position information of the wireless pointer component 140 based on the one or more HCI signals from the wireless pointer component 140. In one particular example, the base component 150 includes a receiving unit 152, a processing unit 154, and a transmitting unit 156. The receiving unit 152 is configured to receive the one or more HCI signals from the transmitting unit 144 of the wireless pointer component 140. In the example of FIG. 2, the receiving unit 152 is generally shown as being implemented using a first sensor 252 and a second sensor 254. For example, the first and second sensors 252, 254 may be ultrasound sensors separated by a distance of 2$d$. The transmitting unit 144 of the wireless pointer component 140 is located at Point 1 210 with coordinate (x1, y1), which is away from the first sensor 452 by a first distance L1 and away from the second sensor 454 by a second distance L2.

Figure 6:
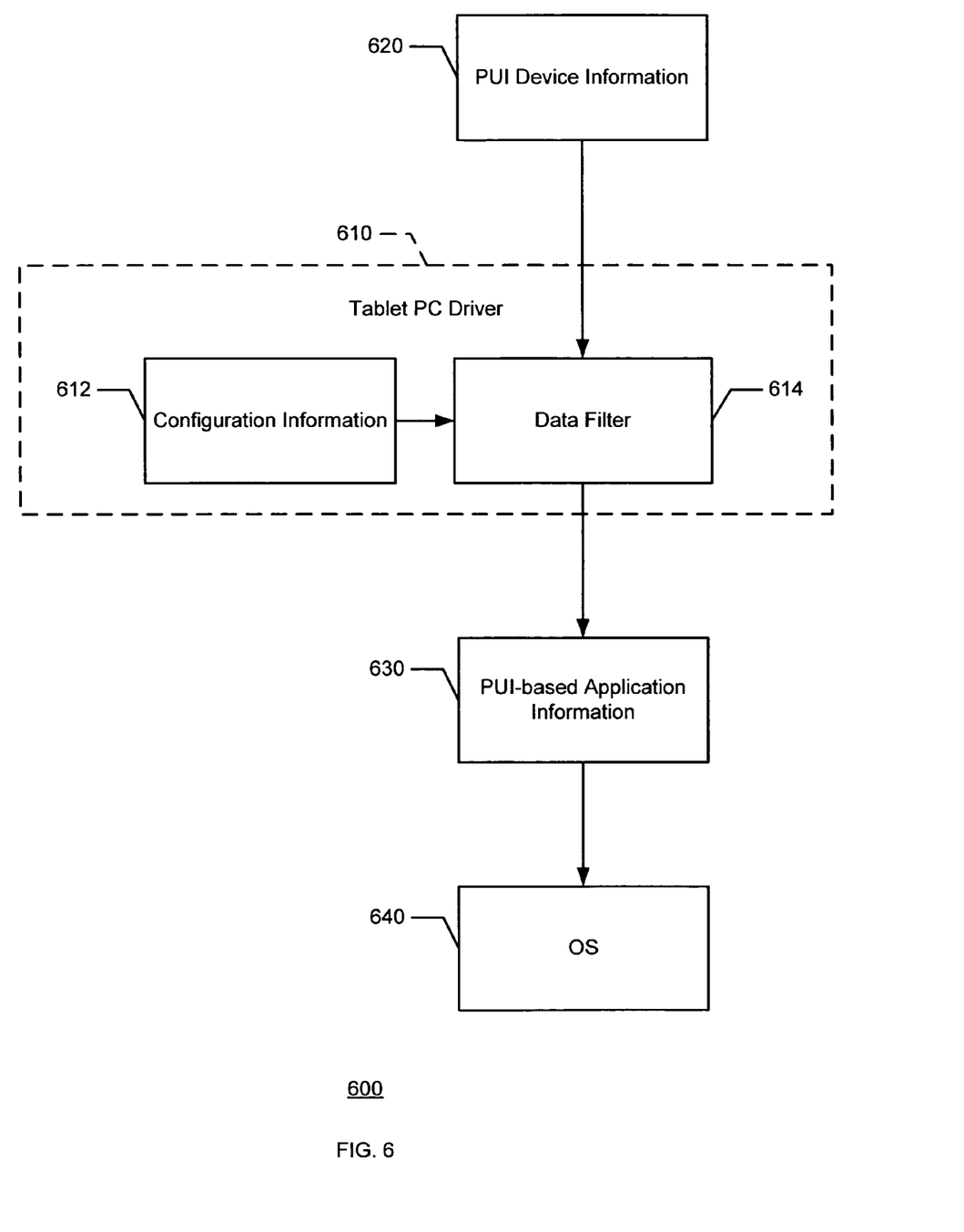
FIG. 6 is a block diagram represent of an example system driver of the example handheld PUI system shown in FIG. 1.

When the wireless pointer component 140 is triggered (e.g., the tip 642 of FIG. 6 is pressed on the screen 632 of the display 630), the transmitting unit 144 of the wireless pointer component 140 transmits one or more ultrasonic signals to the first and second sensors 252, 254 of the base component 150. The one or more ultrasonic signals from the transmitting unit 144 reaches the first and second sensors 252, 254 at different times because the first and second distances L1, L2 between the transmitting unit 144 and the first and second sensors 252, 254, respectively, are different. Persons of ordinary skill in the art will readily appreciate that the base component 150 detects the time difference between receiving the one or more ultrasonic signals from the transmitting unit 144 via the first and second distances L1, L2.

The processing unit 154 is operatively coupled to the receiving unit 152. In response to the receiving unit 152 detecting the one or more ultrasonic signals, the processing unit 154 is configured to generate position information of the wireless pointer component 140 by converting to distance from time and speed of propagation of the one or more ultrasonic signals. In one particular example, the processing unit 154 calculates the first and second distances L1, L2 for the processor 120 to calculate the coordinate (x, y) of the transmitting unit 144 as described in detail below.

The transmitting unit 156 is operatively coupled to the processing unit 154. Further, the transmitting unit 156 is configured to transmit the position information generated by the processing unit 154 to the processor 120 via the second communication link 170 so that the processor 120 may generate screen information corresponding to the HCI event on the screen 132 of the display 130.

Figure 3:
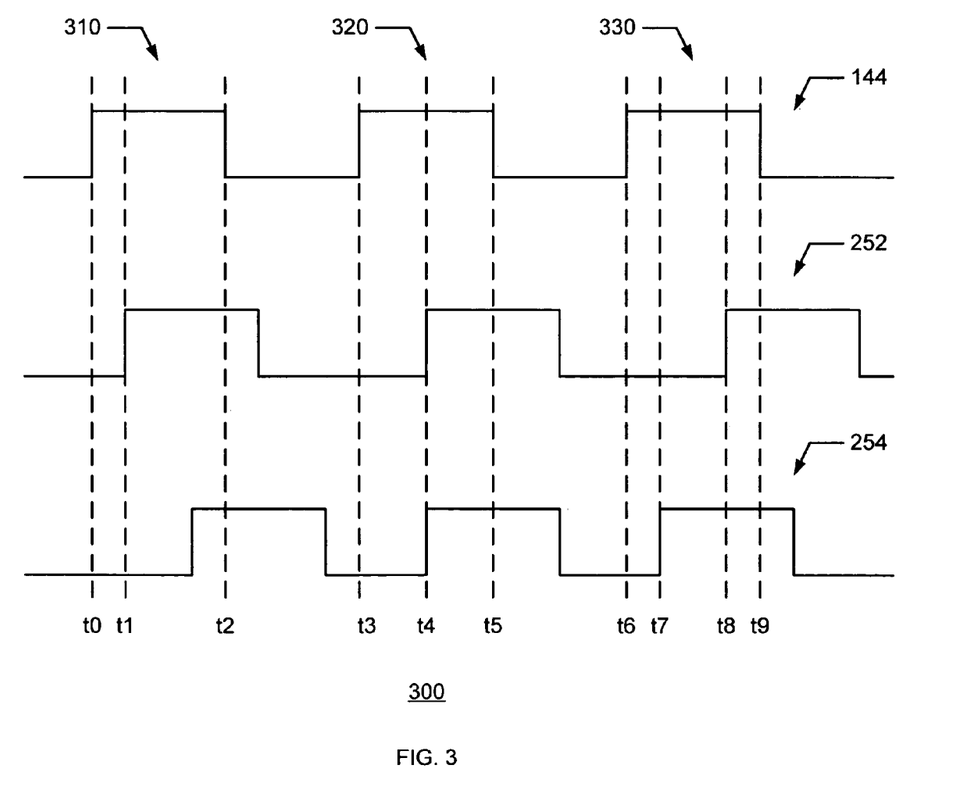
FIG. 3 is a timing diagram representation of example HCI signals of the example handheld PUI system shown in FIG. 1.

As the wireless pointer component 140 moves from Point 1 210 at coordinate (x1, y1) to Point 2 220 at coordinate (x2, y2) and then to Point 3 230 at coordinate (x3, y3), the first and second sensors 252, 254 receives the one or more ultrasonic signals from the transmitting unit 144 of the wireless pointer component 140 at different times. In the example of FIG. 3, the transmitting unit 144 transmits a first HCI signal 310 at Point 1 210 from time t0 until time t2. The first sensor 252 detects the first HCI signal 310 starting from time t1 whereas the second sensor 254 detects the first HCI signal 310 starting from time t2, which is later than time t1, because the first sensor 252 is closer to Point 1 210 than the second sensor 254 (i.e., the first sensor 252 receives the first HCI signal 310 before the second sensor 254). The transmitting unit 144 stops transmission from time t2 to time t3, and then starts transmission again at time t3. When the transmitting unit 144 transmits a second HCI signal 320 at Point 2 220 from time t3 until time 5, both the first and second sensors 252, 254 detect the second HCI signal 320 simultaneously at time t4 because the first and second sensors 252, 254 are equidistant from Point 2 220. The transmitting unit 144 stops transmission from time t5 to time t6, and then starts transmission again at time t6. When the transmitting unit 144 transmits a third HCI signal 330 at Point 3 230 from time t6 until time t9, the second sensor 254 detects the third HCI signal 330 at time t7 whereas the first sensor 252 detects the third HCI signal 330 at time t8, which is later than time t7, because the second sensor 254 is closer to Point 3 230 than the first sensor 252 (i.e., the second sensor 254 receives the HCI signal 330 before the first sensor 252).

Figure 4:
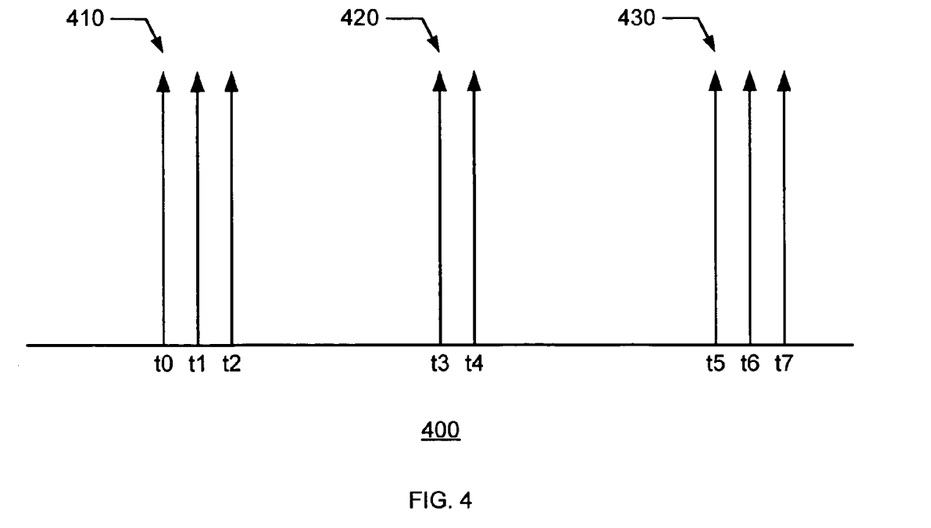
FIG. 4 is a time diagram representation of other example HCI signals of the example handheld PUI system shown in FIG. 1.

Alternatively, the transmitting unit 144 may encode the one or more HCI signals before transmission. In the example of FIG. 4, the transmitting unit 144 encodes a first HCI signal 410 and transmits the first HCI signal 410 from Point 1 210 at time t0. The first sensor 252 detects the first HCI signal 410 at time t1 whereas the second sensor 254 detects the first HCI signal 410 at time t2 because the first sensor 252 is closer to Point 1 210 than the second sensor 254. As the wireless pointer component 140 moves toward Point 2 220, the transmitting unit 144 encodes a second HCI signal 420 with a code different than that of the first HCI signal 410 so that the first and second sensors 252, 254 may identify the second HCI signal 420 as a different signal to detect the time of receipt to calculate the coordinate of Point 2 220. At time t3, the transmitting unit 144 transmits the second HCI signal 420, and both the first and second sensors 252, 254 detect the second HCI signal 420 at the same time (i.e., time t4) because the first and second sensors 252, 254 are equidistant from Point 2 220. At time t5, the transmitting unit 144 transmits a third HCI signal 430 from Point 3 230. Likewise, the transmitting unit 144 encodes the third HCI signal 430 with a code different than that of the first and second HCI signals 410, 420. The second sensor 254 detects the third HCI signal 430 at time t6 whereas the first sensor 252 detects the third HCI signal 430 at time t7 because the second sensor 254 is closer to Point 3 230.

Further, the handheld PUI device 110 may be operate in a hover mode. In particular, the transmitting unit 144 of the wireless pointer component 140 may continuously transmit one or more HCI signals without being triggered by the detecting unit 142 (e.g., without the tip 642 of FIG. 6 being pressed on the screen 632 of the display 630). The base component 150 may receive the HCI signal, generate position information based on the HCI signal, and transmit the position information to the processor 120 as described above. In addition to operating in a write mode as described in detail above, the handheld PUI device 110 may also operate in other modes such as an erase mode, select mode, scroll mode, etc. by pressing a button (e.g., the buttons 644 and 744 shown in FIGS. 6 and 7, respectively) on the wireless pointer component 140 to toggle between the different operating modes. Persons of ordinary skill in the art will readily appreciate that other methods in addition to a button-based system may be implemented on the handheld PUI device 110 to switch from different operating modes such as a level-based system, a knob-based system, a voice recognition-based system, etc.

While components shown in FIG. 1 are depicted as separate blocks within the handheld PUI device 110, the functions performed by some of these blocks may be integrated within a single semiconductor circuit or may be implemented using two or more separate integrated circuits. For example, although the receiving unit 152 and the transmitting unit 156 are depicted as separate blocks within the base component 150, persons of ordinary skill in the art will readily appreciate that the receiving unit 152 and the transmitting unit 156 may be integrated within a single semiconductor circuit.

Figure 5:
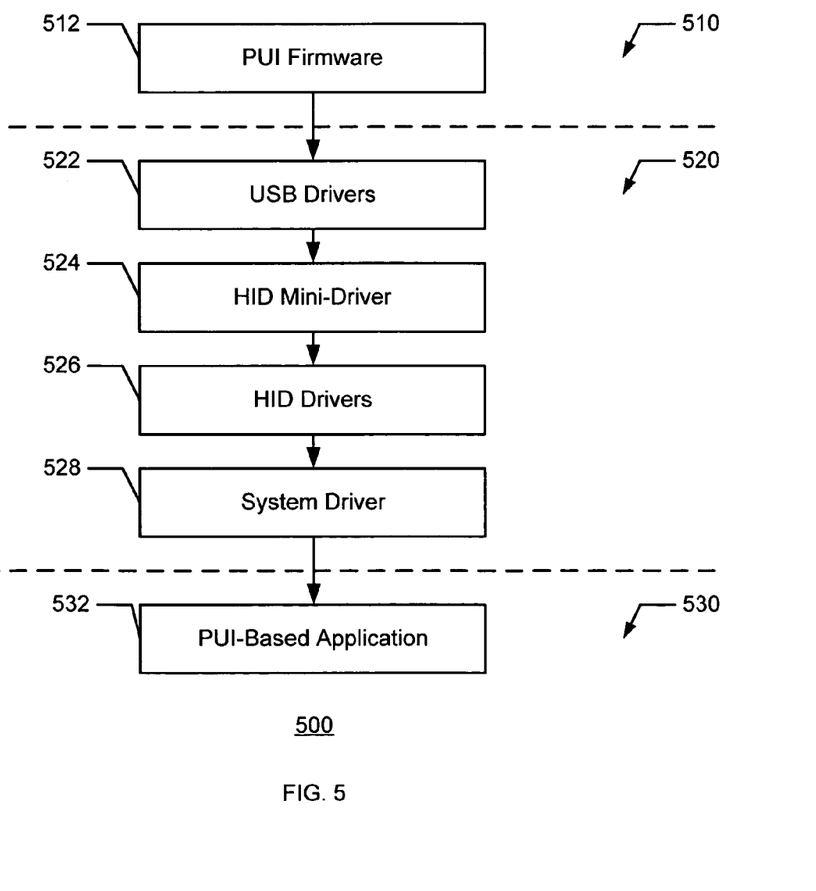
FIG. 5 is a block diagram representation of an example architectural hierarchy of the example handheld PUI system shown in FIG. 1.

In the example of FIG. 5, the illustrated architectural hierarchy 500 of the handheld PUI system 100 includes hardware 510, one or more drivers 520, and one or more applications 530. The PUI firmware 512 of the hardware 510 (i.e., the wireless pointer component 140 and/or the base component 150) transmits position information to the processor 120 through a universal serial bus (USB) port via the second communication link 170. To generate screen information (e.g., writing and/or drawing) on the display 130, the drivers 520 and applications 530 of the processor 120 process the position information from the firmware 510. The USB drivers 522 map the physical bus transactions to USB transfers. The human input device (HID) mini-driver 524 uses the USB transfers to access configuration and data information from the USB drivers 522 (e.g., USB device descriptor, report descriptor, input and output report, etc.). To construct the HID collection (i.e., a USB logic device), the HID mini-driver 524 passes the configuration and data information to the HID drivers 526. Typically, the HID drivers 526 are configured to provide an interface between a bus driver (e.g., the USB drivers 522) and an interactive input device (e.g., the hardware 510). As described in detail below, the system driver 528 is configured as a filter and/or an adaptor to convert data of the USB logic device to the required format of PUI-based applications 532. For example, the system driver 528 may be a Tablet PC driver configured to convert data of the USB logic device to the required format of Microsoft® Windows® XP Tablet PC Edition. The PUI-based applications 532 receive the data from the PUI firmware 512 and responds accordingly. Thus, the system driver 528 configures the handheld PUI device 140 to provide a non-application specific user interface to any applications of the processor 120.

In the example of FIG. 6, the illustrate Tablet PC driver 610 converts PUI device information 620 from the HID drivers 526 to PUI-based application information 630 for the PUI-based applications 532. The HID drivers 526 may provide PUI device information 620 such as trigger information, position information, temperature information, error code, and/or a package identifier to the Tablet PC driver 610. The trigger information indicates the status of the tip, button(s), etc. on the wireless pointer component 140. For example, the trigger information may be a 3-bit field indicating status of the tip 742, the button 744, and a user-defined button (not shown) on the wireless pointer component 740 shown in FIG. 7. The position information indicates distances L1 and L2 (i.e., the traveling time of the one or more HCI signals from the transmitting unit 144 of the wireless pointer component 140 to the first and second sensors 252, 254 of the one or more base components 150). The temperature information is used to compensate sound speed in calculating the screen information as described below. The error code indicates potential error of the one or more HCI signals. The packet identifier indicates a sequence of the frame of the one or more HCI signals.

The Tablet PC driver 610 includes configuration information 612 and a data filter 614. The configuration information 612 may include information such as size information of the screen 132, base component position information of the one or more base components 150 (e.g., mounting location of the one or more base components 150), and/or optimizing algorithms to improve consistency of incoming data. The screen size information indicates the size of the screen 132 such as 15-inch, 17-inch, 19-inch, or any other suitable size of a display. The base component position information indicates the mounting location of the one or more base components 150 on or proximate to the display 130. For example, the base component position information may indicate which side(s) of the display 130 and offset(s) in x- and/or y-direction(s).

Based on the configuration information, the data filter 614 generates PUI-based application information 630. The PUI-based application information 630 is in a format recognized by the OS 640 such as Microsoft® Windows® XP Tablet PC Edition (i.e., the PUI device information 620 is not detected and/or recognized by the OS 640). For example, the PUI-based application 630 may include trigger information, screen information, pressure information, and/or tilt information. The trigger information indicates the status of the wireless pointer component 140. For example, the trigger information may indicate the status of the tip 742, a barrel button (e.g., a secondary button corresponding to "right-click"), write/erase mode (i.e., whether the wireless pointer component 140 is operating to write or to erase), calibration (i.e., whether the wireless pointer component 140 is upside-down or right-side up for the erase mode), and range (i.e., whether the wireless pointer component 140 is in range of the one or more base components 150). The screen information includes x-y coordinate(s) of the wireless pointer component 140 relative to one or more locations of the screen 132 such as the upper-left corner, upper-right corner, lower-left corner, lower-right corner, and/or center of the screen 132. For example, the data filter 614 may calculate the coordinate (x, y) of the transmitting unit 144 in the wireless pointer component 140 based on the following:

$$x=(L1^2-L2^2)/4d, \text{ and}$$

$$y=\sqrt{(L2^2-((L1^2-L2^2-4d^2)/4d)^2)}.$$

The pressure information indicates the weight of the HID event. For example, a line drawn by a user may be light than another drawn line if the pressure information indicates a greater weight for the latter. The tilt information indicates the angle of the HID event. As a result, the Tablet PC driver 610 configures the handheld PUI device 140 to operate in any applications managed by the OS 640.

Figure 7:
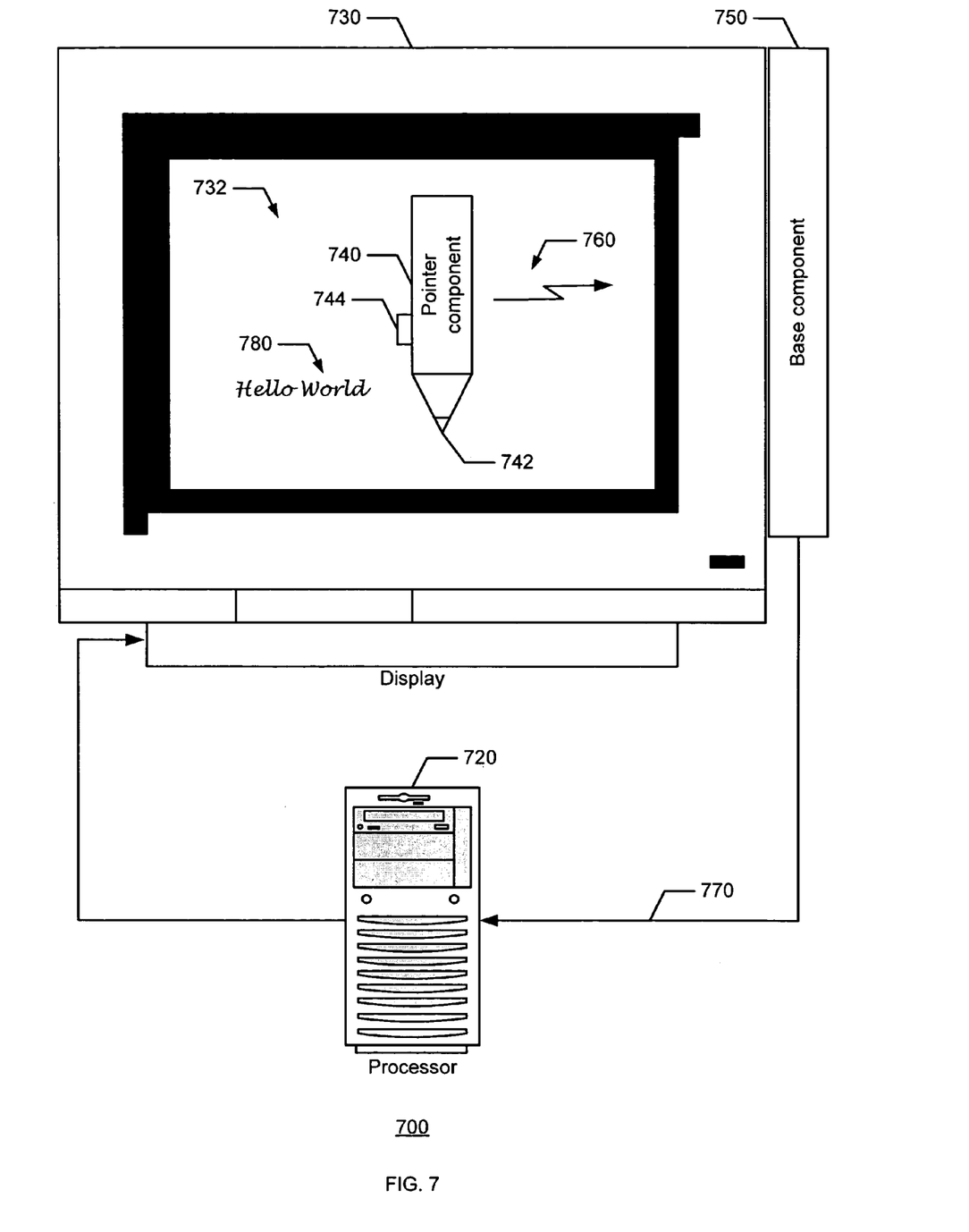
FIG. 7 is a schematic diagram representation of the example handheld PUI system shown in FIG. 1.

For example, the handheld PUI device 110 may be implemented on a desktop computer using a device such as a stylus or a pen. In the example of FIG. 7, the illustrated desktop computer 700 includes a processor 720 and a display 730 (i.e., a monitor), which are separate components operatively coupled together as persons of ordinary skill in the art will readily recognize. The display 730 may be a cathode ray tube (CRT) display, a liquid crystal display (LCD), a light-emitting diode (LED) display, a plasma display, and/or any other suitable image projection display. As described in detail below, the wireless pointer component 740 may be a stylus or an electronic pen configured to transmit one or more HCI signals (e.g., ultrasonic signals) based on an HCI event initiated by a user on the screen 732 of the display 730 to one or more base components 750 via the first communication link 760. For example, the user may use the wireless pointer component 740 to write "Hello World" 780 directly on the screen 732 of the display 730. Accordingly, the wireless pointer component 740 transmits one or more HCI signals while the user is writing "Hello World" 780. One or more base components 750 are disposed in fixed positions relative to the screen 732 of the display 730 to receive the one or more HCI signals from the wireless pointer component 740. For example, one or more base components 750 may be disposed on or proximate to the screen 732 of the display 730. Based on the one or more HCI signals, the one or more base components 750 are configured to generate and transmit position information of the wireless pointer component 740 to the processor 720 via the second communication link 770. Accordingly, the processor 720 generates screen information corresponding to the HCI event on the screen 732 of the display 730. For example, the processor 720 converts the position information from the one or more base components 750 into pixels. Thus, the processor 720 generates "Hello World" 780 as one or more pixels on the screen 732 of the display 730 to appear as if the user had wrote "Hello World" directly on the screen 732.

While components shown in FIG. 7 are depicted as separate blocks within the desktop computer 700, the functions performed by some of these blocks may be integrated within a single semiconductor circuit or may be implemented using two or more separate integrated circuits. For example, although the processor 720 and the display 730 are depicted as separate blocks within the desktop computer 700, persons of ordinary skill in the art will readily appreciate that the processor 720 and the display 730 may be integrated within a single unit such as a tablet PC and/or a laptop (e.g., the laptop 800 of FIG. 8).

Figure 8:
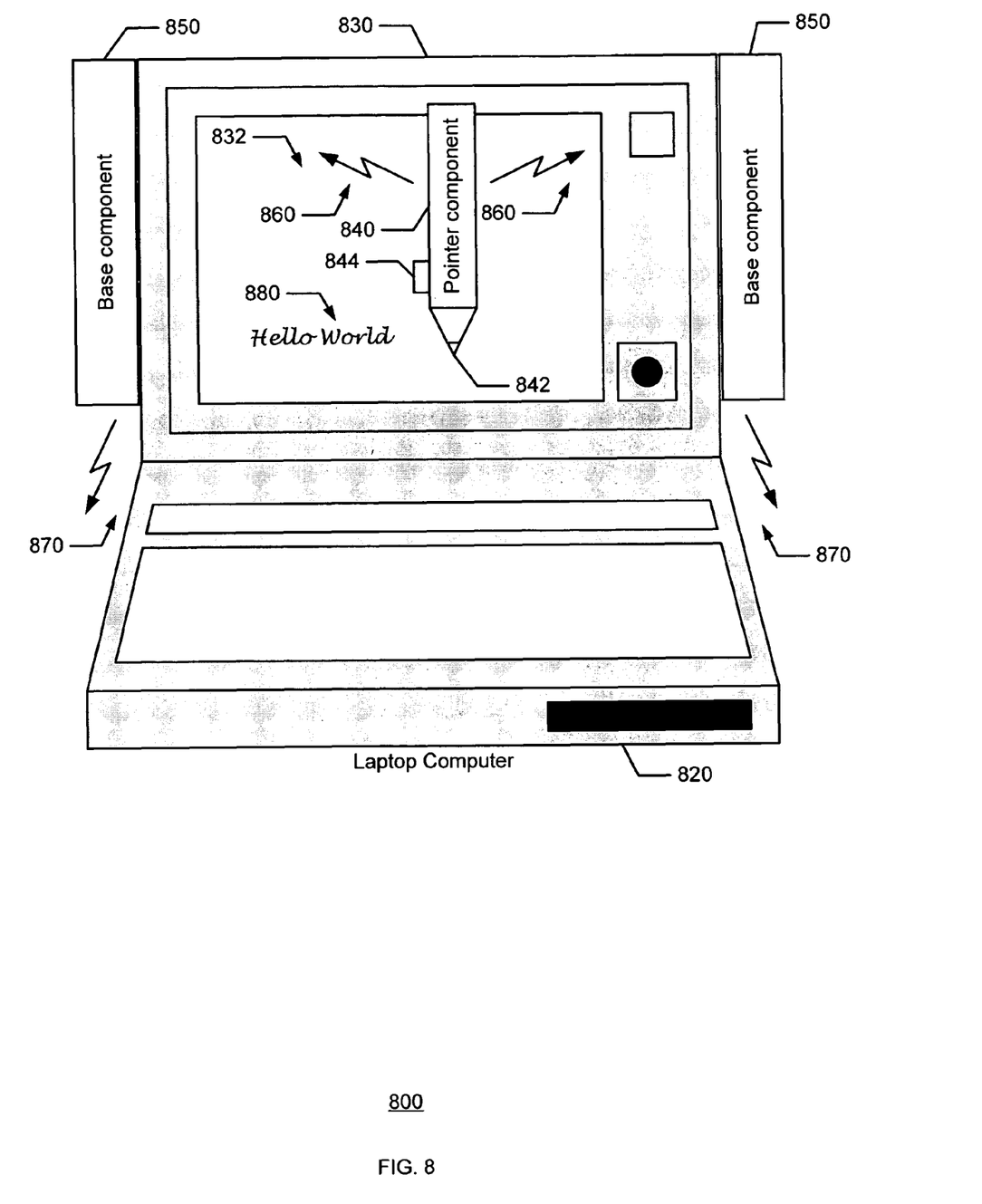
FIG. 8 is another schematic diagram representation of the example handheld PUI system shown in FIG. 1.

In the example of FIG. 8, the illustrated laptop computer 800 includes a processor 820 and a display 830. The processor 820 is operatively coupled to the display 830 as persons of ordinary skill in the art will readily recognize. The wireless pointer component 840 may be a stylus or an electronic pen configured to transmit one or more HCI signals based on an HCI event initiated by a user on the screen 832 of the display 830 to one or more base components 850 via the first communication link 860. The one or more base components 850 are disposed relative to the screen 832 of the display 830 to receive the one or more HCI signals from the wireless pointer component 840. Based on the one or more HCI signals, the one or more base components 850 are configured to generate and transmit position information to the processor 820 via the second communication link 870. For example, the second communication link 870 may be a wireless link operating in accordance with an 802.11 communication protocol developed by the Institute of Electrical and Electronics Engineers (i.e., the IEEE 802.11 standard, IEEE std. 802.11-1997, published 1997), a Bluetooth communication protocol, and/or an infrared communication protocol developed by the Infrared Data Association. Accordingly, the processor 820 generates screen information corresponding to the HCI event on the screen 832 of the display 830. Thus, the processor 820 generates "Hello World" 880 as one or more pixels on the screen 832 of the display 830 to appear as if the user had wrote "Hello World" directly on the screen 832.

Figure 9:
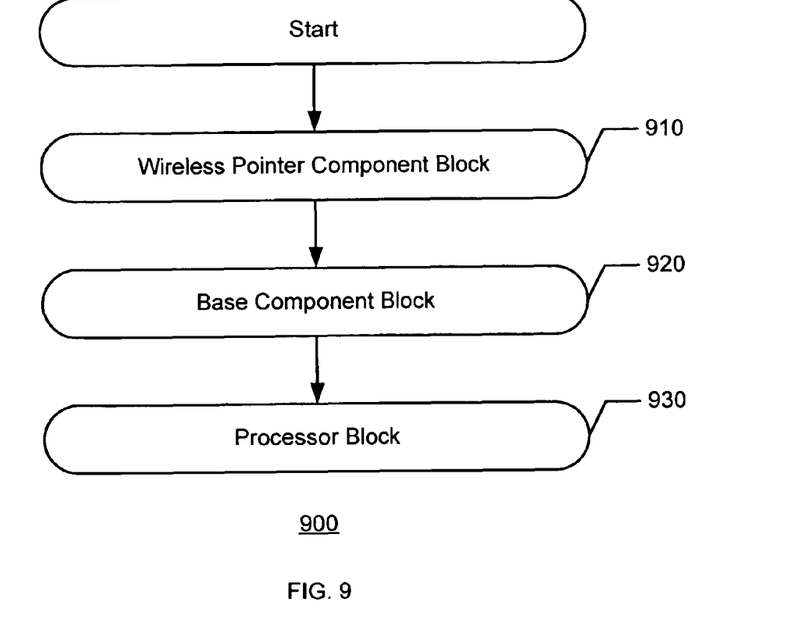
FIG. 9 is a flow diagram representation of example machine readable instructions that may be executed to implement the example handheld PUI system shown in FIG. 1.

A flow diagram 900 representing machine readable instructions that may be executed by a processor to provide a handheld pointer-based user interface is illustrated in FIG. 9. Persons of ordinary skill in the art will appreciate that the instructions may be implemented in any of many different ways utilizing any of many different programming codes stored on any of many computer-readable mediums such as a volatile or nonvolatile memory or other mass storage device (e.g., a floppy disk, a CD, and a DVD). For example, the machine readable instructions may be embodied in a machine-readable medium such as an erasable programmable read only memory (EPROM), a read only memory (ROM), a random access memory (RAM), a magnetic media, an optical media, and/or any other suitable type of medium. Alternatively, the machine readable instructions may be embodied in a programmable gate array and/or an application specific integrated circuit (ASIC). Further, although a particular order of actions is illustrated in FIG. 9, persons of ordinary skill in the art will appreciate that these actions can be performed in other temporal sequences. Again, the flow diagram 900 is merely provided as an example of one way to provide a handheld pointer-based user interface.

Figure 10:
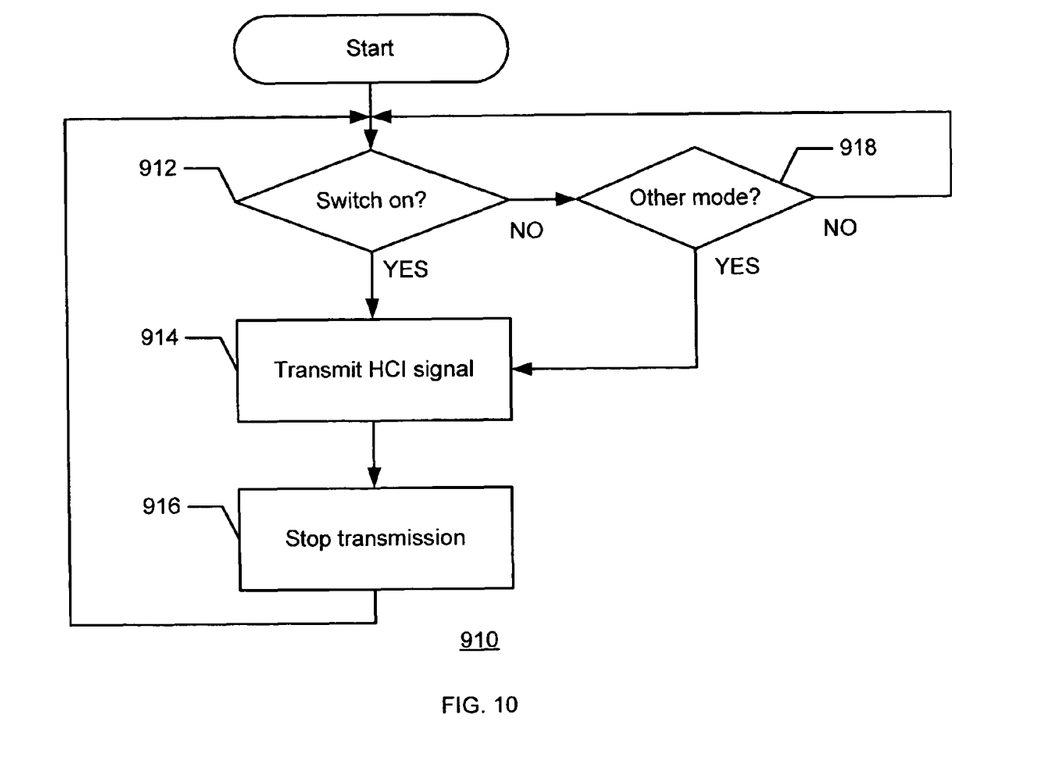
FIG. 10 is a flow diagram representation of example machine readable instructions that may be executed to implement the example wireless pointer component of the example handheld PUI system shown in FIG. 1.

The flow diagram 900 includes a wireless pointer component block 910, a base component block 920, and a processor block 930. In particular, the flow diagram 800 begins with the wireless pointer component block 910 of the wireless pointer component 140 to detect an HCI event initiated by a user on the screen 132 of the display 130. In one particular example as shown in FIG. 10, the wireless pointer component 140 may determine whether the detecting unit 142 is switched on (block 912). For example, the user may press the tip 742 of the wireless pointer component 740 to write and/or draw directly on the screen 732 of the display 730. If the detecting unit 142 is switched on then the transmitting unit 144 transmits an HCI signal corresponding to the location of the wireless pointer component 140 to the one or more base component 150 via the first communication link 160 (block 914). For example, the wireless pointer component 140 may transmit an ultrasonic signal based on hand motion of the user on the screen 132 of the display 130. After a time period, transmitting unit 144 then stops the transmission (block 916), and controls return to block 912. Otherwise, if the detecting unit 142 is switched off (i.e., the tip 742 is not depressed onto the screen 732 of the display 730), controls proceed to determine whether the user may switch between different operating modes via the button 244 (block 918). Thus, the user may also use the wireless pointer component 240, for example, to select and/or scroll through a document displayed on the screen 232 of the display 230. If the wireless pointer component 140 is used to other operating modes then the transmitting unit 144 transmits the HCI signal (block 914) and stops the transmission after a time period (block 916), and then controls return to block 912. If the wireless pointer component 140 is not used for other operating modes then controls directly return to block 912.

Figure 11:
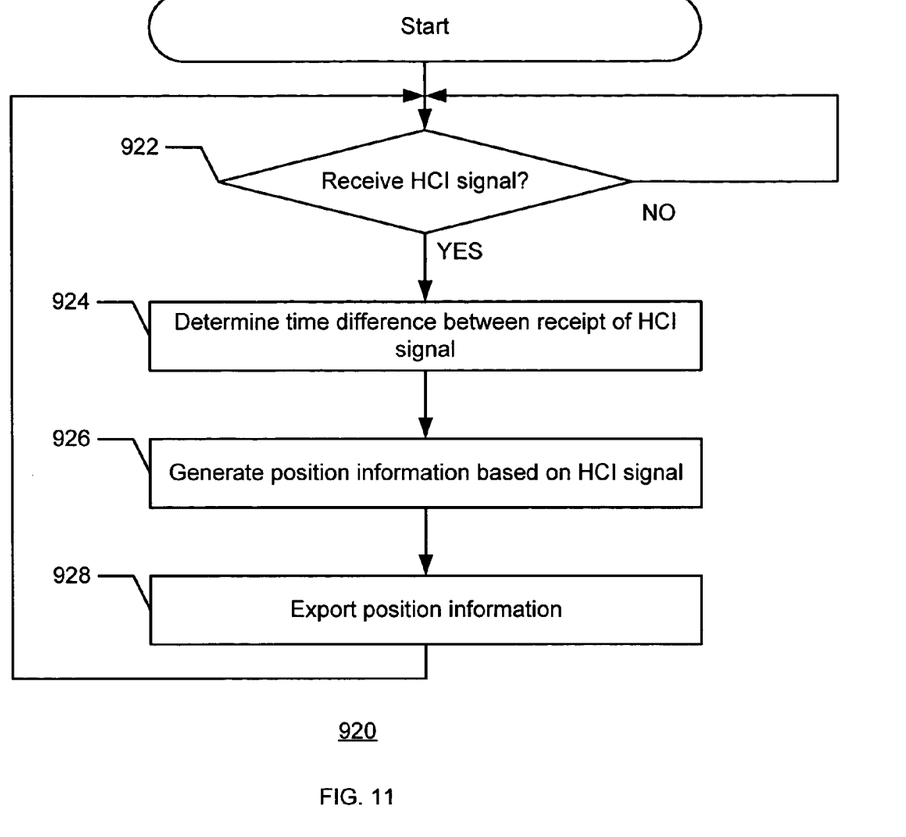
FIG. 11 is a flow diagram representation of example machine readable instructions that may be executed to implement the example base component of the example handheld PUI system shown in FIG. 1.

Each of the one or more base components 150 is configured to execute the base component block 920. In the example of FIG. 11, each of the one or more base components 150 determines whether the first and second sensors 252, 254 of the receiving unit 152 received an HCI signal (block 922). If the first and second sensors 252, 254 received the HCI signal, the processing unit 154 determines the time difference between receipt of the HCI signal by the first and second sensors 252, 254 (block 924). Based on the time difference, the processing unit 154 generates position information associated with the wireless pointer component 140 (block 926). For example, the processing unit 154 may calculate one or more coordinates of the wireless pointer component 140 relative to the screen 132 of the display 130. The transmitting unit 156 of the one or more base components 150 then exports the position information to the processor 120 via the second communication link 170 (block 928). Otherwise, if the first and second sensors 252, 254 did not receive the HCI signal, controls directly return to block 922.

Figure 12:
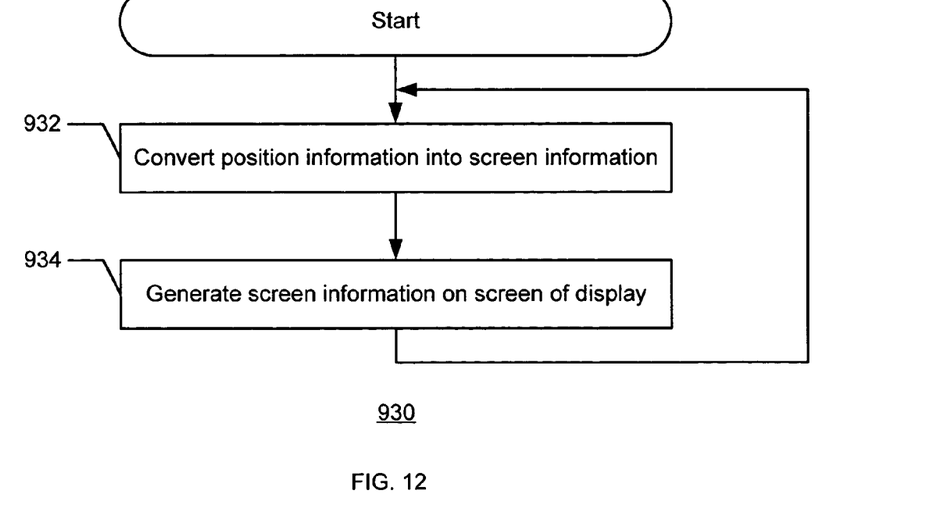
FIG. 12 is a flow diagram representation of example machine readable instructions that may be executed to implement the example processor of the example handheld PUI system shown in FIG. 1.

In the example of FIG. 12, the processor 120 executes the processor block 930 by processing the position information exported from the one or more base components 150. The processor 120 converts the position information into screen information (block 932) and generates the screen information on the screen 132 of the display 130 (block 934). For example, the one or more drivers 520 convert each coordinate of the wireless pointer component 140 into one or more pixels and notify the operating system (OS) of the processor 120 (e.g., Microsoft® Windows® XP Tablet PC Edition) of the corresponding display format. The OS provides a notification of the corresponding display format to the one or more applications 530 and waits for a response to the notification from the one or more applications 530. Thus, the handheld PUI device 110 provides an alternative user interface to the mouse and/or the keyboard that is based on natural and intuitive hand motion of the user without integrating costly touch-screen technology into the display 130.

Figure 13:
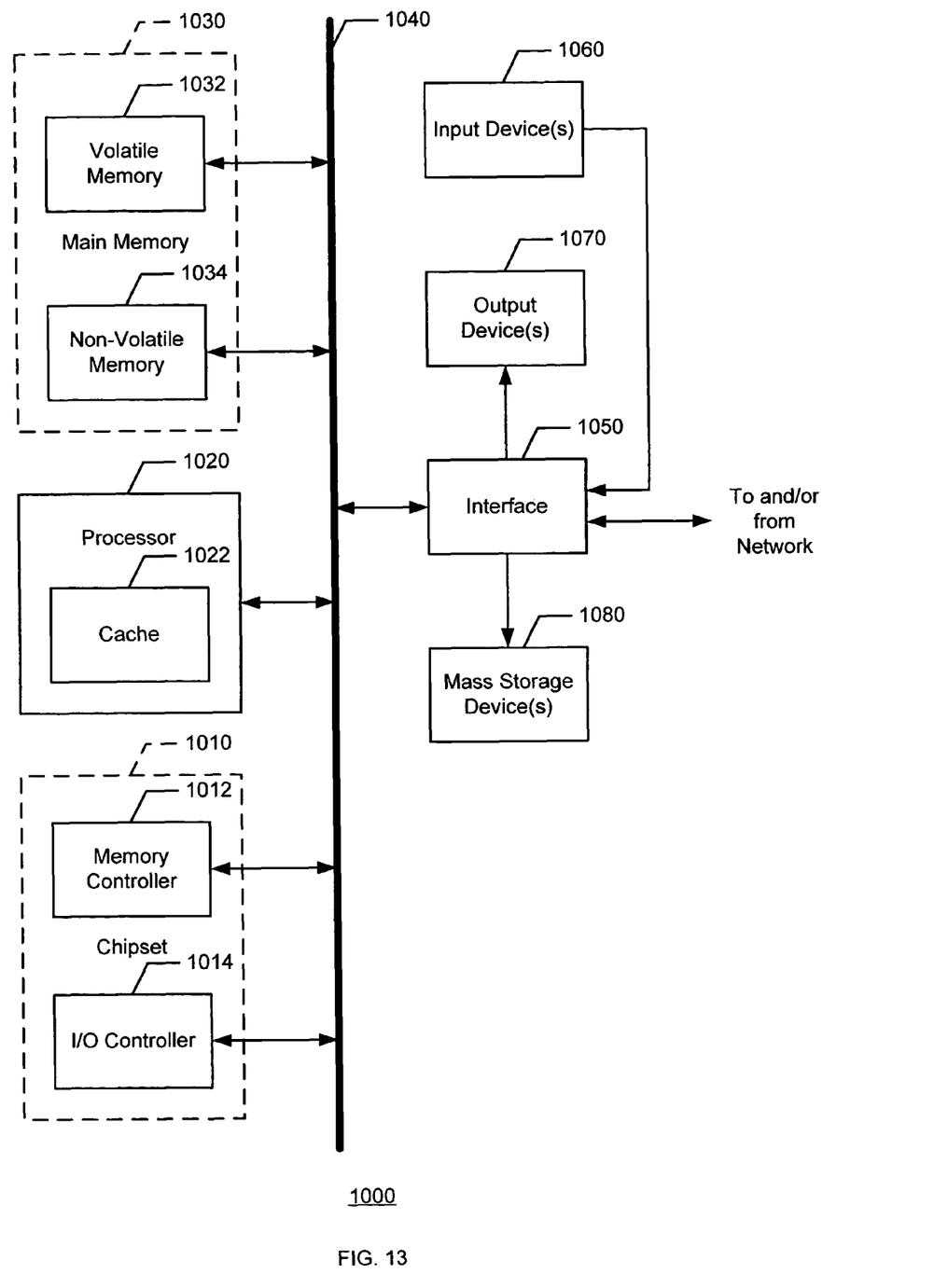
FIG. 13 is a block diagram representation of an example processor system that may used to implement the example handheld PUI system shown in FIG. 1.

FIG. 13 is a block diagram of an example processor system 1000 adapted to implement the methods and apparatus disclosed herein. The processor system 1000 may be a desktop computer, a laptop computer, a notebook computer, a personal digital assistant (PDA), a server, an Internet appliance or any other type of computing device.

The processor system 1000 illustrated in FIG. 13 includes a chipset 1010, which includes a memory controller 1012 and an input/output (I/O) controller 1014. As is well known, a chipset typically provides memory and I/O management functions, as well as a plurality of general purpose and/or special purpose registers, timers, etc. that are accessible or used by a processor 1020. The processor 1020 is implemented using one or more processors. For example, the processor 1020 may be implemented using one or more of the Intel® Pentium® family of microprocessors, the Intel® Itanium® family of microprocessors, Intel® Centrino® family of microprocessors, and/or the Intel XScale® family of processors. In the alternative, other processors or families of processors may be used to implement the processor 1020. The processor 1020 includes a cache 1022, which may be implemented using a first-level unified cache (L1), a second-level unified cache (L2), a third-level unified cache (L3), and/or any other suitable structures to store data as persons of ordinary skill in the art will readily recognize.

As is conventional, the memory controller 1012 performs functions that enable the processor 1020 to access and communicate with a main memory 1030 including a volatile memory 1032 and a non-volatile memory 1034 via a bus 1040. The volatile memory 132 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 may be implemented using flash memory, Read Only Memory (ROM), Electrically Erasable Programmable Read Only Memory (EEPROM), and/or any other desired type of memory device.

The processor system 1000 also includes an interface circuit 1050 that is coupled to the bus 1040. The interface circuit 1050 may be implemented using any type of well known interface standard such as an Ethernet interface, a universal serial bus (USB), a third generation input/output interface (3GIO) interface, and/or any other suitable type of interface.

One or more input devices 1060 are connected to the interface circuit 1050. The input device(s) 1060 permit a user to enter data and commands into the processor 1020. For example, the input device(s) 1060 may be implemented by a keyboard, a mouse, a touch-sensitive display, a track pad, a track ball, an isopoint, and/or a voice recognition system.

One or more output devices 1070 are also connected to the interface circuit 1050. For example, the output device(s) 1070 may be implemented by display devices (e.g., a light emitting display (LED), a liquid crystal display (LCD), a cathode ray tube (CRT) display, a printer and/or speakers). The interface circuit 1050, thus, typically includes, among other things, a graphics driver card.

The processor system 1000 also includes one or more mass storage devices 1080 configured to store software and data. Examples of such mass storage device(s) 1080 include floppy disks and drives, hard disk drives, compact disks and drives, and digital versatile disks (DVD) and drives.

The interface circuit 1050 also includes a communication device such as a modem or a network interface card to facilitate exchange of data with external computers via a network. The communication link between the processor system 1000 and the network may be any type of network connection such as an Ethernet connection, a digital subscriber line (DSL), a telephone line, a cellular telephone system, a coaxial cable, etc.

Access to the input device(s) 1060, the output device(s) 1070, the mass storage device(s) 1080 and/or the network is typically controlled by the I/O controller 1014 in a conventional manner. In particular, the I/O controller 1014 performs functions that enable the processor 1020 to communicate with the input device(s) 1060, the output device(s) 1070, the mass storage device(s) 1080 and/or the network via the bus 1040 and the interface circuit 1050.

While the components shown in FIG. 13 are depicted as separate blocks within the processor system 1000, the functions performed by some of these blocks may be integrated within a single semiconductor circuit or may be implemented using two or more separate integrated circuits. For example, although the memory controller 1012 and the I/O controller 1014 are depicted as separate blocks within the chipset 1010, persons of ordinary skill in the art will readily appreciate that the memory controller 1012 and the I/O controller 1014 may be integrated within a single semiconductor circuit.

The methods and apparatus disclosed herein are well suited for desktop computers, laptop computers, tablet PCs, etc. However, persons of ordinary skill in the art will appreciate that the teachings of the disclosure may be applied to other processor systems such as portable and/or handheld devices including personal digital assistants, pocket PCs, cellular telephones, etc:

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method to provide a handheld pointer-based user interface comprising:

encoding, at a wireless pointer component, a first human-computer interaction (HCI) signal with a first code to correspond to a first time associated with a first HCI operation;

transmitting via a first communication link the first encoded HCI signal from the wireless pointer component to a base component that is operatively coupled to a screen of a display;

encoding, at the wireless pointer component, a second HCI signal with a second code to correspond to a second time associated with the first HCI operation;

transmitting via the first communication link the second encoded HCI signal from the wireless pointer component to the base component, wherein the first code and the second code differ to indicate a difference between the first time the second time;

generating position information associated with the wireless pointer component based on one of the first and second HCI signals; and transmitting via a second communication link the position information from the base component to a processor configured to generate screen information on the screen of the display.

2. A method as defined in claim 1, wherein the first time corresponds to a first position of the wireless pointer component, and wherein the second time corresponds to a second position of the wireless pointer component.

3. A method as defined in claim 1, further comprising transmitting a third HCI signal associated with one of writing, drawing, selecting, or scrolling directly on the screen of the display with the wireless pointer component by a user.

4. A method as defined in claim 1, wherein the screen of the display is associated with one of a desktop computer, a laptop computer, or a handheld computer.

5. A method as defined in claim 1, wherein transmitting via the first communication link the first HCI signal and the second HCI signal from the wireless pointer component to the base component operatively coupled to the screen of the display comprises transmitting the first HCI signal and the second HCI signal from the wireless pointer component to the base component in response to one of pressing a tip of the wireless pointer component on the screen of the display or pressing a button of the wireless pointer component.

6. A method as defined in claim 1, wherein transmitting via the second communication link the position information from the base component to the processor configured to generate screen information on the screen of the display comprises transmitting the position information from the base component to the processor via one or more communication links operating in accordance with one of an 802.11-based communication protocol, a Bluetooth-based communication protocol, or an infrared-based communication protocol.

7. A method as defined in claim 1, further comprising converting the position information from a first format to a second format based on configuration information associated with one of the base component or the screen of the display.

8. A method as defined in claim 1, further comprising generating one or more coordinates of the wireless pointer component relative to the screen of the display based on the position information.

9. A method as defined in claim 1, further comprising operatively coupling the base component on a side of the display to receive the first HCI signal and the second HCI signal.

10. A machine readable medium storing instructions, which when executed, cause a machine to:

encode, at a wireless pointer component, a first human-computer interaction (HCI) signal with a first code to correspond to a first time associated with a first HCI operation;

transmit via a first communication link the first encoded HCI signal from the wireless pointer component to a base component that is operatively coupled to a screen of a display;

encode, at the wireless pointer component, a second HCI signal with a second code to correspond to a second time associated with the first HCI operation;

transmit via the first communication link the second encoded HCI signal from the wireless pointer component to the base component, wherein the first code and the second code differ to indicate a difference between the first time and the second time;

generate position information of associated with the wireless pointer component based on one of the first and second HCI signals; and transmit via a second communication link the information from the base component to a processor configured to generate screen information on the screen of the display.

11. A machine readable medium as defined in claim 10, wherein the first time corresponds to a first position of the wireless pointer component, and wherein the second time corresponds to a second position of the wireless pointer component.

12. A machine readable medium as defined in claim 10, wherein the instructions, when executed, cause the machine to transmit via the first communication link the first HCI signal and the second HCI signal from the wireless pointer component to the base component operatively coupled to the screen of the display by transmitting a third HCI signal associated with one of writing, drawing, selecting, or scrolling directly on the screen of the display with the wireless pointer component by a user.

13. A machine readable medium as defined in claim 10, wherein the instructions, when executed, cause the machine to transmit via the first communication link the first HCI signal and the second HCI signal from the wireless pointer component to the base component operatively coupled to the screen of the display by transmitting the first HCI signal and the second HCI signal from the wireless pointer component to the base component operatively coupled to the screen of the display associated with one of a desktop computer, a laptop computer, or a hand held computer.

14. A machine readable medium as defined in claim 10, wherein the instructions, when executed, cause the machine to transmit via the first communication link the first HCI signal and the second HCI signal from the wireless pointer component to the base component operatively coupled to the screen of the display by transmitting the first HCI signal and the second HCI signal from the wireless pointer component to the base component in response to one of pressing a tip of the wireless pointer component on the screen of the display or pressing a button of the wireless pointer component.

15. A machine readable medium as defined in claim 10, wherein the instructions, when executed, cause the machine to convert the position information from a first format to a second format based on configuration information associated with one of the base component or the screen of the display.

16. A machine readable medium as defined in claim 10, wherein the instructions, when executed, cause the machine to generate one or more coordinates of the wireless pointer component relative to the screen of the display based on the position information.

17. An apparatus to provide a handheld pointer-based user interface comprising:

a wireless pointer component configured to encode a first human-computer interaction (HCI) signal with a first code to correspond to a first time associated with a first HCI operation and to transmit via a first communication link the first encoded HCI signal, wherein the wireless pointer component is configured to encode a second HCI signal with a second code to correspond to a second time associated with the first HCI operation and to transmit via the first communication link the second encoded HCI signal;

a base component operatively coupled to a screen of a display to receive via the first communication link the first and second encoded HCI signals from the wireless pointer component, the base component being configured to generate position information associated with the wireless pointer component based on the first and second encoded HCI signals, wherein the first code and the second code differ to indicate a difference between the first time and the second time; and a processor configured to generate screen information on the screen of the display, wherein the processor is to receive via a second communication link the position information from the base component.

18. An apparatus as defined in claim 17, wherein the first time corresponds to a first position of the wireless pointer component, and wherein the second time corresponds to a second position of the wireless pointer component.

19. An apparatus as defined in claim 17, wherein the wireless pointer component comprises one of a stylus or an electronic pen.

20. An apparatus as defined in claim 17, wherein the screen information comprises one or more coordinates calculated based on the position information.

21. An apparatus as defined in claim 17, wherein the processor comprises one of a desktop computer, a laptop computer, or a handheld computer.

22. An apparatus as defined in claim 17, wherein the display comprises one of a cathode ray tube (ORT) display, a liquid crystal display (LCD), a light-emitting diode (LED) display, or a plasma display.

23. An apparatus as defined in claim 17, wherein the second communication link operates in accordance with one of an 802.11-based communication protocol, a Bluetooth-based communication protocol, or an infrared-based communication protocol.

24. A processor system to provide a hand held pointer-based user interface comprising:

a display having a screen configured to generate one of text or graphics;

a processor operatively coupled to the display to generate screen information on the screen of the display; and a handheld pointer-based user interface device having a wireless pointer component configured to transmit via a first communication link one or more human-computer interaction (HCI) signals associated with an HCI operation, wherein a first one of the HCI signals associated with the HCI operation is encoded differently from a second one of the HCI signals associated with the HCI operation to indicate a difference in time between a first time corresponding to the first one of the HCI signals and a second time corresponding to the second one of the HCI signals, and a base component operatively coupled to the screen of the display to receive via the first communication link the HCI signals from the wireless pointer component and configured to generate position information associated with the wireless pointer component based on the HCI signals, and to transmit via a second communication link the position information from the one or more base components to the processor.

25. A processor system as defined in claim 24, wherein the HCI signals correspond to one of writing, drawing, selecting, or scrolling directly on the screen of the display with the wireless pointer component by a user.

26. A processor system as defined in claim 24, wherein the wireless pointer component comprises one of a stylus or an electronic pen.

27. A processor system as defined in claim 24, wherein the screen information comprises one or more coordinates calculated based on the position information.

28. A processor system as defined in claim 24, wherein the processor comprises one of a desktop computer, a laptop computer, or a handheld computer.

29. A processor system as defined in claim 24, wherein the display comprises one of a cathode ray tube (ORT) display, a liquid crystal display (LCD), a light-emitting diode (LED) display, or a plasma display.

30. A processor system as defined in claim 24, wherein the second communication link operates in accordance with one of an 802.11-based communication protocol, a Bluetooth-based communication protocol, or an infrared-based communication protocol.

* * * * *

UNITED STATES PATENT AND TRADEMARK OFFICE
CERTIFICATE OF CORRECTION

PATENT NO. : 7,735,024 B2  
APPLICATION NO. : 10/697672  
DATED : June 8, 2010  
INVENTOR(S) : Li et al.

Page 1 of 1

It is certified that error appears in the above-identified patent and that said Letters Patent is hereby corrected as shown below:

Column 11, line 3 (claim 1), after "the first time" insert --and--.

Column 12, line 3 (claim 10), after "information" delete "of".

Column 13, line 25 (claim 22), replace "(ORT)" with --(CRT)--.

Column 14, line 31 (claim 29), replace "(ORT)" with --(CRT)--.

Signed and Sealed this  
Eighth Day of February, 2011

David J. Kappos  
*Director of the United States Patent and Trademark Office*